United States Patent Office.

OSCAR MAX SPILLER, M. D., OF AKRON, OHIO.

Letters Patent No. 105,011, dated July 5, 1870.

IMPROVED MEDICAL COMPOUND FOR THE CURE OF FEVER AND AGUE.

The Schedule referred to in these Letters Patent and making part of the same.

I, OSCAR MAX SPILLER, of Akron, in the county of Summit, State of Ohio, have invented a certain Compound Ether for the cure of Fever and Ague, Chills and Fever, Malaria or Swamp-Fever, and for the relief of paroxysm of other fevers; to be used as an inhalation.

The nature of my invention consists in mixing and distilling calisaya or cinchona bark, or their alkaloids, lime, and coffee, in such a manner with sulphuric acid and rectified alcohol, as to to produce an ether.

To prepare this ether I put a qantity of calisaya or cinchona bark, or their varieties, containing the alkaloids cinchonine and quinine, and a solution of lime, or I can also use the quinide of lime alone or in connection with it, let it macerate for some time, and add to it a quantity of macerated coffee, tea, or any other material producing the same effect on the nervous system and blood. I then add to it, in a retort, sulphuric acid and alcohol, expose it to a sufficient heat of a sand or water bath, or of steam, until a sufficient quantity of ethereal preparation has been distilled over into a receiving vessel. I again distil the preparation received by this manipulation, over chlor-calcium, in order to remove the containing water, as is done with other ethers, which is then to be used with the most beneficial effect in cases of fever and ague, chills and fever, malaria or swamp-fever, and during the paroxysm of other fevers, and in the same manner as sulphuric ether or chloroform would be used, but in smaller quantity.

I claim as my invention—

The improvement of an ether of such ingredients or their substitutes, prepared substantially as and for the purpose hereinbefore set forth.

OSCAR MAX SPILLER, M. D.

Witnesses:
JULIUS GEORGII,
LEE ROY WOODS,
J. T. HAMILTON.